US012563155B2

(12) United States Patent
Ren et al.

(10) Patent No.: US 12,563,155 B2
(45) Date of Patent: Feb. 24, 2026

(54) VIDEO SYNTHESIS METHOD AND APPARATUS

(71) Applicant: Beijing Zitiao Network Technology Co., Ltd., Beijing (CN)

(72) Inventors: Long Ren, Beijing (CN); Zhaoxiang Ma, Beijing (CN); Defeng Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 18/726,107

(22) PCT Filed: Dec. 19, 2022

(86) PCT No.: PCT/CN2022/139940
§ 371 (c)(1),
(2) Date: Jul. 1, 2024

(87) PCT Pub. No.: WO2023/125097
PCT Pub. Date: Jul. 6, 2023

(65) Prior Publication Data
US 2025/0159104 A1     May 15, 2025

(30) Foreign Application Priority Data
Dec. 31, 2021     (CN) .......................... 202111671074.4

(51) Int. Cl.
*H04N 7/01*          (2006.01)
*G11B 27/031*      (2006.01)

(52) U.S. Cl.
CPC ........... *H04N 7/013* (2013.01); *G11B 27/031* (2013.01); *H04N 7/0122* (2013.01)

(58) Field of Classification Search
CPC ..... H04N 7/013; H04N 7/0122; G11B 27/031
See application file for complete search history.

(56) References Cited

U.S. PATENT DOCUMENTS

2009/0116821 A1 *  5/2009  Shibamiya ....... H04N 21/41265
                                                          386/248
2009/0310023 A1    12/2009  Nakayama
(Continued)

FOREIGN PATENT DOCUMENTS

CN          102137248 A       7/2011
CN          103220577 A       7/2013
(Continued)

OTHER PUBLICATIONS

First Office Action for Chinese Application No. 202111671074.4, mailed on Apr. 25, 2025, 15 Pages.
(Continued)

*Primary Examiner* — Mishawn N. Hunter
(74) *Attorney, Agent, or Firm* — Astute IP Law Group

(57)          ABSTRACT

Embodiments of the present disclosure provide a video synthesis method and apparatus, and relate to the technical field of video processing. The method comprises: receiving a video synthesis instruction for instructing the synthesis of at least two video clips; determining a hardware configuration parameter of the video synthesis apparatus; determining performance information of the video synthesis apparatus according to the hardware configuration parameter; determining a first resolution and a first frame rate according to the performance information and a preset correspondence, wherein the preset correspondence includes a correspondence between the performance information and the first resolution and the first frame rate; and synthesizing the at least two video clips based on the first resolution and the first frame rate.

20 Claims, 3 Drawing Sheets

Receiving a video synthesis instruction ~S11

Determining a hardware configuration parameter of the video synthesis apparatus ~S12

Determining performance information of the video synthesis apparatus according to the hardware configuration parameter ~S13

Determining a first resolution and a first frame rate according to the performance information and a preset correspondence ~S14

Synthesizing the at least two video clips based on the first resolution and the first frame rate ~S15

(56) References Cited

U.S. PATENT DOCUMENTS

| | | | |
|---|---|---|---|
| 2014/0098182 A1 | 4/2014 | Kramarenko et al. | |
| 2016/0247537 A1* | 8/2016 | Ricciardi | G06V 20/42 |
| 2017/0025155 A1* | 1/2017 | Fang | H04N 21/4402 |
| 2018/0027177 A1* | 1/2018 | Lin | G06F 9/4881 |
| | | | 348/207.1 |
| 2019/0037173 A1* | 1/2019 | Lee | G06F 3/04842 |
| 2019/0188479 A1* | 6/2019 | Balasubramanian | G06T 7/251 |

FOREIGN PATENT DOCUMENTS

| | | | |
|---|---|---|---|
| CN | 105979286 A | 9/2016 | |
| CN | 106658037 A | 5/2017 | |
| CN | 107948731 A | 4/2018 | |
| CN | 109120997 A | 1/2019 | |
| CN | 110012217 A | 7/2019 | |
| CN | 111935542 A | 11/2020 | |
| CN | 113038165 A | 6/2021 | |
| CN | 113055706 A | 6/2021 | |
| WO | 2017096825 A1 | 6/2017 | |

OTHER PUBLICATIONS

Hi Format Screen Recorder: "How to Set Parameters for Video Merging," Oct. 19, 2022, 2 pages. Retrieved from the Internet URL: https://www.zhihu.com/question/426300636/answer/1531418797.
"Is the Higher the Video Frame Rate the Better," Jan. 11, 2021, 2 pages. Retrieved from the Internet URL: https://www.lingfenmao.com/it/2568.html.
International Search Report and Written Opinion for PCT/CN2022/139940, mailed Mar. 6, 2023, 14 pages.

* cited by examiner

| Receiving a video synthesis instruction | ~ S11 |

| Determining a hardware configuration parameter of the video synthesis apparatus | ~ S12 |

| Determining performance information of the video synthesis apparatus according to the hardware configuration parameter | ~ S13 |

| Determining a first resolution and a first frame rate according to the performance information and a preset correspondence | ~ S14 |

| Synthesizing the at least two video clips based on the first resolution and the first frame rate | ~ S15 |

FIG.1

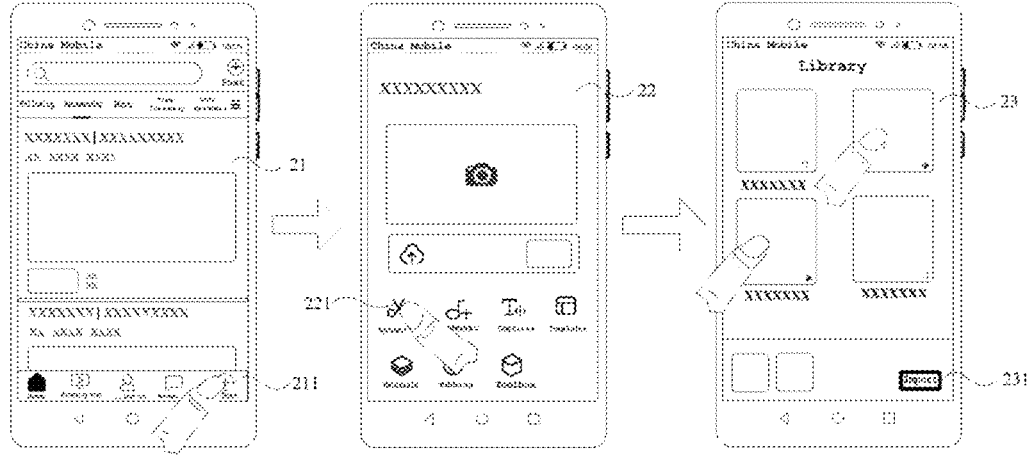

FIG.2

| receiving a first instruction | ~ S31 |

| in response to the first instruction, synthesizing the at least two video clips according to the third resolution and the third frame rate | ~ S32 |

VIDEO SYNTHESIS METHOD AND APPARATUS

CROSS-REFERENCE TO RELATED APPLICATIONS

The present application is a U.S. National Stage application under 35 U.S.C. § 371 of International Application No. PCT/CN2022/139940, as filed on Dec. 19, 2022, which claims priority to the Chinese Patent Application No. 202111671074.4 filed on Dec. 31, 2021 and entitled "Video synthesis method and APPARATUS", the disclosure of which is incorporated by reference herein in its entirety.

TECHNICAL FIELD

The present disclosure relates to the technical field of video processing, and in particular, to a video synthesis method and apparatus.

BACKGROUND

Video synthesis technology refers to the technology of synthesizing multiple video clips into a video. With the rapid development of terminal technology and mobile communications technology, more and more users start creation of video content using video synthesis apparatuses, and in the creation process of video content, there is often a need to synthesize multiple video clips into a video.

SUMMARY

Embodiments of the present disclosure provide the following technical solutions:

In a first aspect, an embodiment of the present disclosure provides a video synthesis method, which is applied to a video synthesis apparatus, the method comprising:

receiving a video synthesis instruction for instructing the synthesis of at least two video clips;

determining a hardware configuration parameter of the video synthesis apparatus;

determining performance information of the video synthesis apparatus according to the hardware configuration parameter;

determining a first resolution and a first frame rate according to the performance information and a preset correspondence, wherein the preset correspondence includes a correspondence between the performance information and the first resolution and the first frame rate; and synthesizing the at least two video clips based on the first resolution and the first frame rate.

In some embodiments, the obtaining a hardware configuration parameter of the video synthesis apparatus comprises:

determining the type of the video synthesis apparatus; and obtaining the hardware configuration parameter of the video synthesis apparatus according to the type of the video synthesis apparatus.

In some embodiments, the hardware configuration parameter includes:

at least one of a parameter of a Central Processing Unit (CPU) of the video synthesis apparatus, a parameter of a Graphics Processing Unit (GPU) of the video synthesis apparatus.

In some embodiments, the determining performance information of the video synthesis apparatus according to the hardware configuration parameter comprises:

inputting the hardware configuration parameter into a preset model, and obtaining the performance information of the video synthesis apparatus output from the preset model.

In some embodiments, the synthesizing the at least two video clips based on the first resolution and the first frame rate comprises:

determining a second resolution and a second frame rate, wherein the second resolution is a resolution of a video clip with a maximum resolution among the at least two video clips, and the second frame rate is a frame rate of a video clip with a maximum frame rate among the at least two video clips;

determining a target resolution according to the first resolution and the second resolution;

determining a target frame rate according to the first frame rate and the second frame rate; and synthesizing the at least two video clips into a video with a resolution being the target resolution and a frame rate being the target frame rate.

In some embodiments, the determining a target resolution according to the first resolution and the second resolution comprises:

determining whether the second resolution is greater than the first resolution;

if yes, determining the first resolution as the target resolution;

if not, determining the second resolution as the target resolution.

In some embodiments, the determining a target frame rate according to the first frame rate and the second frame rate comprises:

determining whether the second frame rate is greater than the first frame rate;

if yes, determining the first frame rate as the target frame rate;

if not, determining the second frame rate as the target frame rate.

In some embodiments, the method further comprises:

receiving a first instruction for instructing the synthesis of the at least two video clips according to a third resolution and a third frame rate;

in response to the first instruction, synthesizing the at least two video clips according to the third resolution and the third frame rate.

In a second aspect, an embodiment of the present disclosure provides a video synthesis apparatus, comprising:

a receiving unit configured to receive a video synthesis instruction for instructing the synthesis of at least two video clips;

a parameter determination unit configured to obtain a hardware configuration parameter of the video synthesis apparatus;

a performance determination unit configured to determine performance information of the video synthesis apparatus according to the hardware configuration parameter;

a processing unit configured to determine a first resolution and a first frame rate according to the performance information and a preset correspondence, wherein the preset correspondence includes a correspondence between the performance information and the first resolution and the first frame rate; and a synthesis unit configured to synthesize the at least two video clips according to the first resolution and the first frame rate.

In some embodiments, the parameter determination unit is specifically configured to determine the type of the video synthesis apparatus; and obtain the hardware configuration parameter of the video synthesis apparatus according to the type of the video synthesis apparatus.

In some embodiments, the hardware configuration parameter includes:

at least one of a parameter of a Central Processing Unit (CPU) of the video synthesis apparatus, a parameter of a Graphics Processing Unit (GPU) of the video synthesis apparatus, and a parameter of a memory of the video synthesis apparatus.

In some embodiments, the performance determination unit is specifically configured to input the hardware configuration parameter into a preset model, and obtain the performance information of the video synthesis apparatus output from the preset model.

In some embodiments, the synthesis unit is specifically configured to determine a second resolution and a second frame rate, wherein the second resolution is a resolution of a video clip with a maximum resolution among the at least two video clips, and the second frame rate is a frame rate of a video clip with a maximum frame rate among the at least two video clips; determine a target resolution according to the first resolution and the second resolution; determine a target frame rate according to the first frame rate and the second frame rate; and synthesize the at least two video clips into a video with a resolution being the target resolution and a frame rate being the target frame rate.

In some embodiments, the synthesis unit is specifically configured to determine whether the second resolution is greater than the first resolution; if yes, determine the first resolution as the target resolution; if not, determine the second resolution as the target resolution.

In some embodiments, the synthesis unit is specifically configured to determine whether the second frame rate is greater than the first frame rate; if yes, determine the first frame rate as the target frame rate; if not, determine the second frame rate as the target frame rate.

In some embodiments, the receiving unit is further configured to receive a first instruction for instructing the synthesis of the at least two video clips according to a third resolution and a third frame rate;

The synthesis unit is further configured to synthesize the at least two video clips according to the third resolution and the third frame rate in response to the first instruction.

In a third aspect, an embodiment of the present disclosure provides an electronic device, comprising: a memory and a processor, wherein the memory is configured to store a computer program; and the processor is configured to, when executing the computer program, cause the electronic device to implement the video synthesis method according to the first aspect or any optional embodiment of the first aspect.

In a fourth aspect, an embodiment of the present disclosure provides a computer readable storage medium storing a computer program thereon, wherein the computer program, when executed by a computing device, causes the computing device to implement the video synthesis method according to the first aspect or any optional embodiment of the first aspect.

In a fifth aspect, an embodiment of the present disclosure provides a computer program product, which, when running on a computer, causes the computer to implement the video synthesis method according to the first aspect or any optional embodiment of the first aspect.

In a sixth aspect, an embodiment of the present disclosure provides a computer program comprising instructions which, when executed by a processor, cause the processor to implement the video synthesis method according to the first aspect.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to more clearly illustrate the technical solutions in the embodiments of the present disclosure or related art, the drawings that need to be invoked in the description of the embodiments or related art will be briefly described below. Obviously, for those skilled in the art, other drawings can be obtained based on these drawings without creative labor.

FIG. 1 is a first step flowchart of a video synthesis method provided by an embodiment of the present disclosure;

FIG. 2 is a first scene interface diagram of a video synthesis method provided by an embodiment of the present disclosure;

FIG. 3 is a second step flowchart of a video synthesis method provided by an embodiment of the present disclosure;

DETAILED DESCRIPTION

Figure 4:
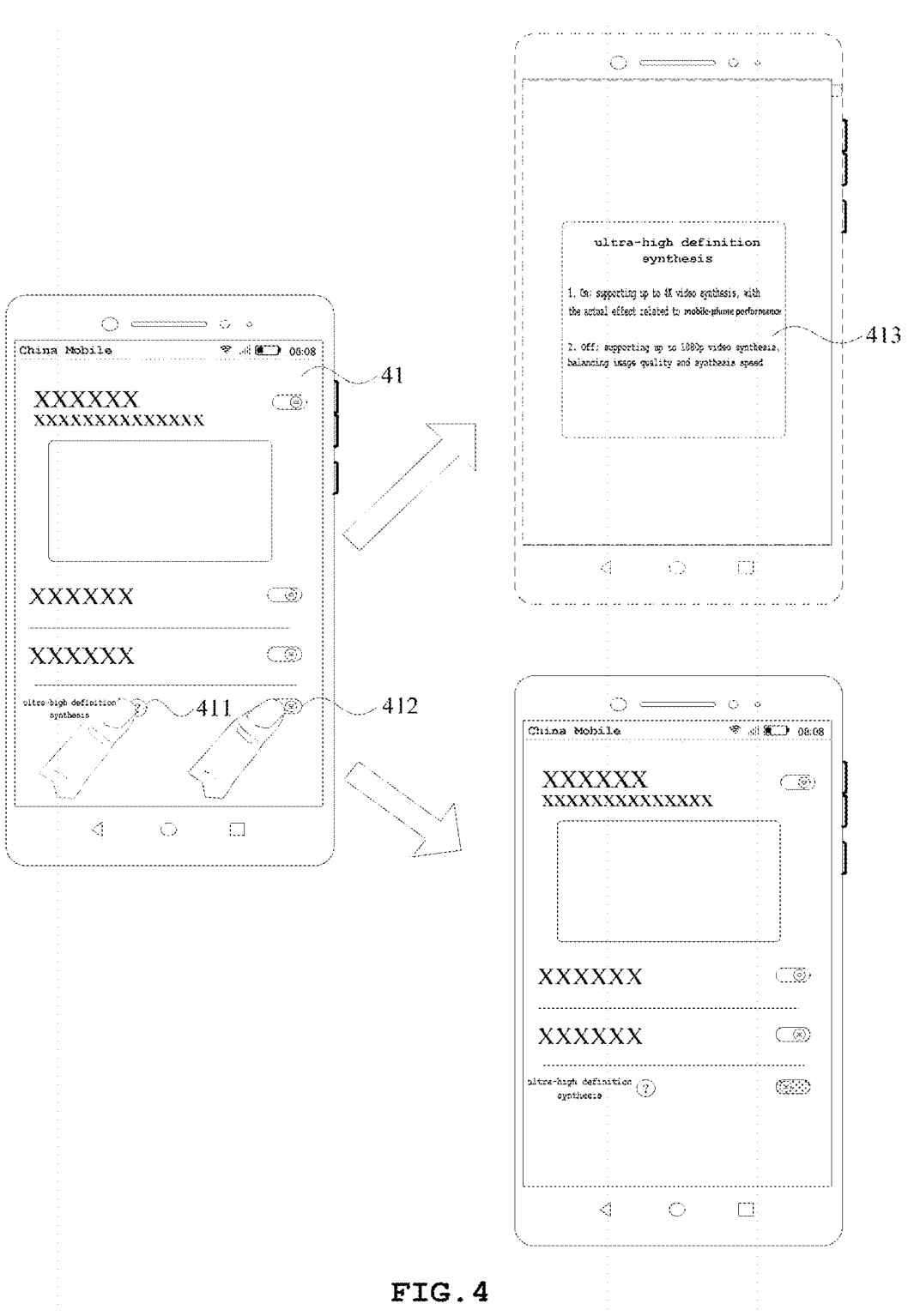
FIG. 4 is a second scene interface diagram of a video synthesis method provided by an embodiment of the present disclosure.

In order to more clearly understand the above-mentioned objects, features and advantages of the present disclosure, the solutions of the present disclosure will be further described below. It should be noted that, in the absence of conflict, the embodiments of the present disclosure and the features therein may be combined with each other.

In the following description, many specific details are set forth to facilitate a full understanding of the present disclosure, but the present disclosure may also be implemented in other ways different from those described herein; it is obvious that the embodiments in the specification are only part of the embodiments of the present disclosure, rather than all of the embodiments.

In the embodiments of the present disclosure, words such as "exemplary" or "for example" are used to indicate examples, instances or illustrations. Any embodiment or design described as "exemplary" or "for example" in the embodiments of the present disclosure should not be construed as preferred or advantageous over other embodiments or designs. Rather, using of the words such as "exemplary" or "such as" are intended to present the relevant concepts in a concrete manner. Furthermore, in the description of the embodiments of the present disclosure, unless otherwise specified, "plurality" means two or more.

The resolution ratios and frame rates of a plurality of video clips involved in video synthesis may be different, and during synthesis, the resolutions and frame rates of respective video clips need to be unified. In the related art, when video synthesis is performed, the resolution and frame rate of the synthesized video are determined according to the system version of a video synthesis apparatus that performs video synthesis operation. For example, a plurality of video clips are synthesized into a 1080p, 30 fps video based on the system version. However, since the types of video synthesis apparatuses used may be different and different types of video synthesis apparatuses may vary greatly in performance, if the resolution and frame rate of the synthesized video are determined to be too large, some video synthesis apparatuses cannot support the video synthesis operation, resulting in poor stability of video synthesis. If the resolution and frame rate of the synthesized video are determined to be too small, the needs of users with higher requirements for video quality cannot be satisfied.

In view of this, embodiments of the present disclosure provide a video synthesis method and apparatus for balancing the stability of video synthesis and the quality of synthesized videos.

An embodiment of the present disclosure provides a video synthesis method, which is applied to a video synthesis apparatus. Exemplarily, the video synthesis apparatus in the embodiment of the present disclosure may be a mobile device, such as a mobile phone, a tablet computer, a laptop computer, a PDA, an in-vehicle terminal, and a wearable device.

Videos from a relatively old time often carry people's memories of an era, and through these videos, people can recall their childhood, cherish the past, relive classics, etc. However, due to immature technology, these videos often have resolutions and frame rates that cannot meet user needs, affecting the viewing experience. The video synthesis method and apparatus provided by the embodiments of the present disclosure can perform ultra-high-definition synthesis on a plurality of video clips, especially on some video clips that are relatively old and whose resolution and frame rate cannot meet user needs. This can improve user experience and provide technical support for ultra-high-definition synthesis of videos for users with corresponding needs and public welfare undertakings.

As shown in FIG. 1, the video synthesis method provided by the embodiment of the present disclosure may comprise the following steps S11 to S15:

S11, receiving a video synthesis instruction,
wherein the video synthesis instruction is for instructing the synthesis of at least two video clips.

In some embodiments, the implementation process of receiving a video synthesis instruction may comprise: receiving a plurality of video clips imported by a user, and operating, by the user, a virtual control for triggering synthesis of the plurality of video clips imported.

Exemplarily, as shown in FIG. 2, in some embodiments, the process of receiving a video synthesis instruction may comprise: displaying a first control 211 for triggering the posting of an image or video in an initial interface 21 of an application. Upon receiving user input to the first control 211, the application jumps to a content creation interface 22, which includes a second control 221 for triggering the synthesis of the video. Upon receiving user input to the second control 221, it jumps to a video clip selection interface 23, which includes a plurality of selectable video clips and a third control 231 for triggering the import of the selected video clips. Upon receiving a user selection input to a plurality of video clips to be synthesized and user input to the third control 231, it is determined that a video synthesis instruction for synthesizing the plurality of video clips that receives the selection operation is received.

S12: determining a hardware configuration parameter of the video synthesis apparatus.

In some embodiments, the hardware configuration parameter of the video synthesis apparatus may include:

at least one of a parameter of a Central Processing Unit (CPU) of the video synthesis apparatus, a parameter of a Graphics Processing Unit (GPU) of the video synthesis apparatus, and a parameter of a memory of the video synthesis apparatus.

In some embodiments, the implementation of obtaining a hardware configuration parameter of the video synthesis apparatus may comprise the following steps a and b:

Step a: determining the type of the video synthesis apparatus;

Step b: obtaining the hardware configuration parameter of the video synthesis apparatus according to the type of the video synthesis apparatus.

Specifically, determining the hardware configuration parameter of the video synthesis apparatus according to the type of the video synthesis apparatus may comprise: searching, according to the type of the video synthesis apparatus, for the hardware configuration parameter published by a manufacturer of the video synthesis apparatus when presenting or releasing the video synthesis apparatus, as the hardware configuration parameter of the video synthesis apparatus.

S13. determining performance information of the video synthesis apparatus according to the hardware configuration parameter.

In some embodiments, the above step S13 (determining performance information of the video synthesis apparatus according to the hardware configuration parameter) comprises:

inputting the hardware configuration parameter into a preset model, and obtaining the performance information of the video synthesis apparatus output from the preset model.

That is, the hardware configuration parameter is processed by the preset model, whereby the performance information of the video synthesis apparatus is obtained.

It should be noted that the performance information of the video synthesis apparatus is positively correlated with the computing performance of the CPU, the graphics processing performance of the GPU, and the size of the memory of the video synthesis apparatus.

S14. determining a first resolution and a first frame rate according to the performance information and a preset correspondence, wherein the preset correspondence includes a correspondence between the performance information and the first resolution and the first frame rate.

In the embodiments of the present disclosure, the resolution of a video refers to the number of valid pixels contained in an image frame of the video. For example, if the resolution of a video is 1080*720, then an image frame of the video contains 1080*720 valid pixels.

In the embodiments of the present disclosure, the frame rate of a video refers to the number of video frames displayed per unit of time. For example, if the frame rate of a video is 60 fps, then the video displays 60 image frames in one second.

Exemplarily, the preset correspondence may be shown in Table 1 below:

TABLE 1

| Preset correspondence | | |
| --- | --- | --- |
| Performance Information Interval | Resolution | Frame rate |
| (+∞, 8.75] | 4k | 60fps |
| [7.47-8.75) | 4k | 30fps |
| [7.2-7.47) | 3k | 30fps |
| [6.7-7.2) | 1080P | 60fps |
| [5.56-6.7) | 1080p | 30fps |
| (0-5.56) | 720p | 30fps |

As shown in Table 1, if performance information of the video synthesis apparatus (the performance information in the embodiments of the present disclosure is also referred to as a performance index value) is 8.75 or above, the first resolution and the first frame rate are determined to be 4K and 60 fps respectively; if the performance information of the video synthesis apparatus belongs to the interval [7.47, 8.75), the first resolution and the first frame rate are determined to be 4K and 30 fps respectively; if the performance information of the video synthesis apparatus belongs to the interval [7.2, 7.47), the first resolution and the first frame rate are determined to be 3K and 30 fps respectively; if the performance information of the video synthesis apparatus belongs to the interval [6, 7.2), the first resolution and the first frame rate are determined to be 1080p and 60 fps respectively; if the performance information of the video synthesis apparatus belongs to the interval [5.56, 6.7), the first resolution and the first frame rate are determined to be 1080p and 30 fps respectively; if the performance information of the video synthesis apparatus belongs to the interval [0, 5.56), the first resolution and the first frame rate are determined to be 720p and 30 fps respectively.

S15. synthesizing the at least two video clips based on first resolution and the first frame rate.

In some embodiments, the above step S15 (synthesizing the at least two video clips based on the first resolution and the first frame rate) comprises the following steps 1 to 4:

Step 1: determining a second resolution and a second frame rate, wherein the second resolution is a resolution of a video clip with a maximum resolution among the at least two video clips, and the second frame rate is a frame rate of a video clip with a maximum frame rate among the at least two video clips.

Exemplarily, the at least two video clips include a first video clip, a second video clip and a third video clip, and the first video clip has a resolution of 720p and a frame rate of 30 fps, the second video clip has a resolution of 1080p and a frame rate of 30 fps, and the third video clip has a resolution of 4 k and a frame rate of 60 fps, then the video clip with the maximum resolution among the at least two video clips is the third video clip, and the video clip with the maximum frame rate among the at least two video clips is the third video clip, and therefore the second resolution and the second frame rate are determined to be 4 k and 60 fps, respectively.

Exemplarily, the at least two video clips include a first video clip, a second video clip and a third video clip, and the first video clip has a resolution of 720p and a frame rate of 30 fps, the second video clip has a resolution of 1080p and a frame rate of 60 fps, and the third video clip has a resolution of 4 k and a frame rate of 30 fps, then the video clip with the maximum resolution among the at least two video clips is the third video clip, and the video clip with the maximum frame rate among the at least two video clips is the second video clip, and therefore the second resolution and the second frame rate are determined to be 4 k and 60 fps, respectively.

Step 2: determining a target resolution according to the first resolution and the second resolution.

In some embodiments, the implementation of the above step 2 (determining a target resolution according to the first resolution and the second resolution) comprises:

determining whether the second resolution is greater than the first resolution;

if yes, determining the first resolution as the target resolution;

if not, determining the second resolution as the target resolution.

That is, the smaller one of the first resolution and the second resolution is determined as the target resolution.

Exemplarily, the first resolution is 4K and the second resolution is 1080p, and since the second resolution is less than the first resolution, the target resolution is determined to be the second resolution, and the target resolution is 1080p.

Exemplarily, the first resolution is 1080p and the second resolution is 4K, and since the second resolution is greater than the first resolution, the target resolution is determined to be the first resolution, and the target resolution is 1080p.

Since the above embodiment can determine the target resolution of the synthesized video based on the first resolution and the second resolution, and the first resolution is a resolution determined according to the performance information of the video synthesis apparatus, and the second resolution is a resolution of a video clip with the maximum resolution among the at least two video clips involved in video synthesis, the above embodiment can avoid excessive increase in the resolution of the video, thereby avoiding the degradation of the image quality of the synthesized video.

Step 3: determining a target frame rate according to the first frame rate and the second frame rate.

In some embodiments, the implementation of the above step 3 (determining a target frame rate according to the first frame rate and the second frame rate) comprises:

determining whether the second frame rate is greater than the first frame rate;

if yes, determining the first frame rate as the target frame rate;

if not, determining the second frame rate as the target frame rate.

That is, the smaller one of the first frame rate and the second frame rate is determined as the target frame rate.

Exemplarily, the first frame rate is 60 fps and the second frame rate is 30 fps, and since the second frame rate is less than the first frame rate, the target resolution is determined to be the second frame rate, and the target frame rate is 30 fps.

Exemplarily, the first frame rate is 30 fps and the second frame rate is 60 fps, and since the second frame rate is greater than the first frame rate, the target frame rate is determined to be the first frame rate, and the target frame rate is 30 fps.

Since the above embodiment can determine the target frame rate of the synthesized video based on the first frame rate and the second frame rate, and the first frame rate is a frame rate determined according to the performance information of the video synthesis apparatus, and the second frame rate is a frame rate of a video clip with the maximum frame rate among the at least two video clips involved in video synthesis, the above embodiment can avoid excessive increase in the frame rate of the video, thereby avoiding an increase in the performance consumption of related devices, without improvement in the video display effect.

Step 4: synthesizing the at least two video clips into a video with a resolution being the target resolution and a frame rate being the target frame rate.

The video synthesis method provided by the embodiment of the present disclosure, upon receiving a video synthesis instruction for instructing the synthesis of at least two video clips, first determines a hardware configuration parameter of the video synthesis apparatus, then determines performance information of the video synthesis apparatus according to the hardware configuration parameter, further determines a first resolution and a first frame rate according to the performance information and a preset correspondence, and finally synthesizes the at least two video clips based on the first resolution and the first frame rate. Since the video synthesis method provided by the embodiment of the present disclosure can determine, in performing video synthesis, the resolution and frame rate according to the performance information of the video synthesis apparatus, and perform video synthesis according to the determined resolution and frame rate, the embodiment of the present disclosure can reasonably determine the resolution and frame rate of the synthesized video according to the performance of the video synthesis apparatus, thereby avoiding the situation where the resolution and frame rate of the synthesized video are too large and the video synthesis apparatus cannot support it, and avoiding the situation where the resolution and frame rate of the synthesized video are too small and the quality of the synthesized video cannot meet the requirements. Therefore, the embodiment of the present disclosure can balance the stability of video synthesis and the quality of the synthesized video.

As an optional embodiment of the embodiment of the present disclosure, as shown in FIG. 3, the video synthesis method provided by the embodiment of the present disclosure further comprises:

S31. receiving a first instruction,
   wherein the first instruction is for instructing the synthesis of the at least two video clips according to a third resolution and a third frame rate.

In some embodiments, the implementation of the above step S31 (receiving a first instruction) may comprise: displaying a control for turning on or off the synthesis of high-quality video, which is in an on state by default, and when it is switched to an off state in response to a user operation, determining that a first instruction has been received, which is for instructing the synthesis of the at least two video clips according to a preset resolution and frame rate.

Exemplarily, as shown in FIG. 4, in some embodiments, a fourth control 411 for triggering the description of an "ultra-high definition synthesis function" and a fifth control 412 for turning on or off the "ultra-high definition synthesis function" are displayed on a synthesized video output interface 41. Upon receiving user input to the fourth control 411, descriptive information 413 for describing the "ultra-high definition synthesis function" is displayed, the description information including: 1. On; supporting up to 4K video synthesis, with the actual effect related to mobile-phone performance; 2. Off; supporting up to 1080p video synthesis, balancing image quality and synthesis speed. The "ultra-high definition synthesis function" is on by default, and when the "ultra-high definition synthesis function" is on, the at least two video clips are synthesized according to the first resolution and the first frame rate. Upon receiving user input to the fifth control 412, the "ultra-high definition synthesis function" is turned off, the reception of the first instruction is acknowledged, and the at least two video clips are synthesized according to the third resolution and the third frame rate.

S32: synthesizing the at least two video clips according to the third resolution and the third frame rate in response to the first instruction.

The video synthesis method provided by the above embodiment can further receive a first instruction, and in response to the first instruction, synthesize the at least two video clips according to the third resolution and the third frame rate. The embodiment of the present disclosure supports the use for customizing the frame rate and resolution of the synthesized video based on requirements, thereby meeting the requirements for customizing the frame rate and resolution of the synthesized video.

In some embodiments, the above step S32 (synthesizing the at least two video clips according to the third resolution and the third frame rate in response to the first instruction) comprises the following steps i to iv:

Step i: determining a second resolution and a second frame rate,
   wherein the second resolution is a resolution of a video clip with a maximum resolution among the at least two video clips, and the second frame rate is a frame rate of a video clip with a maximum frame rate among the at least two video clips.

Step ii: determining a target resolution according to the second resolution and the third resolution.

In some embodiments, the above step ii (determining a target resolution according to the second resolution and the third resolution) comprises:
   determining whether the third resolution is greater than the second resolution;
   if yes, determining the second resolution as the target resolution;
   if not, determining the third resolution as the target resolution.

That is, the smaller one of the third resolution and the second resolution is determined to be the target resolution.

Step iii: determining a target frame rate according to the second frame rate and the third frame rate.

In some embodiments, the above step iii (determining a target frame rate according to the second frame rate and the third frame rate) comprises:
   determining whether the third frame rate is greater than the second frame rate;
   if yes, determining the second frame rate as the target frame rate;
   if not, determining the third frame rate as the target frame rate.

That is, the smaller one of the third frame rate and the second frame rate is determined to be the target frame rate.

Step iv: synthesizing the at least two video clips into a video with a resolution being the target resolution and a frame rate being the target frame rate.

Based on the same inventive concept, as an implementation of the above method, an embodiment of the present disclosure also provides a video synthesis apparatus, which corresponds to the above method embodiment. For ease of reading, this embodiment will no longer repeat the details of the above method embodiment one by one, but it should be clear that the video synthesis apparatus in this embodiment can correspond to all the contents of the above method embodiment.

Figure 5:
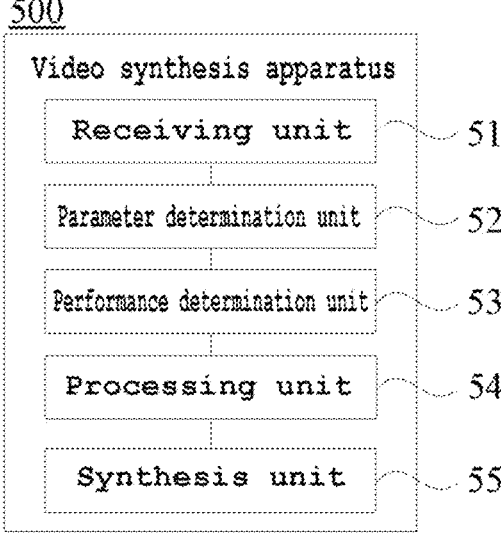
FIG. 5 is a schematic structural diagram of a video synthesis apparatus provided by an embodiment of the present disclosure.

An embodiment of the present disclosure provides a video synthesis apparatus. FIG. 5 is a schematic structural diagram of the video synthesis apparatus. As shown in FIG. 5, the video synthesis apparatus 500 comprises:

a receiving unit 51 configured to receive a video synthesis instruction for instructing the synthesis of at least two video clips;

a parameter determination unit 52 configured to determine a hardware configuration parameter of the video synthesis apparatus;

a performance determination unit 53 configured to determine performance information of the video synthesis apparatus according to the hardware configuration parameter;

a processing unit 54 configured to determine a first resolution and a first frame rate according to the performance information and a preset correspondence, wherein the preset correspondence includes a correspondence between the performance information and the first resolution and the first frame rate;

a synthesis unit 55 configured to synthesize the at least two video clips according to the first resolution and the first frame rate.

In some embodiments, the parameter determination unit 52 is specifically configured to determine the type of the video synthesis apparatus; and determine the hardware configuration parameter of the video synthesis apparatus according to the type of the video synthesis apparatus.

In some embodiments, the hardware configuration parameter includes:

at least one of a parameter of a Central Processing Unit (CPU) of the video synthesis apparatus, a parameter of a Graphics Processing Unit (GPU) of the video synthesis apparatus, and a parameter of a memory of the video synthesis apparatus.

In some embodiments, the performance determination unit 53 is specifically configured to input the hardware configuration parameter into a preset model, and obtain the performance information of the video synthesis apparatus output from the preset model.

In some embodiments, the synthesis unit 55 is specifically configured to determine a second resolution and a second frame rate, wherein the second resolution is a resolution of a video clip with a maximum resolution among the at least two video clips, and the second frame rate is a frame rate of a video clip with a maximum frame rate among the at least two video clips; determine a target resolution according to the first resolution and the second resolution; determine a target frame rate according to the first frame rate and the second frame rate; and synthesize the at least two video clips into a video with a resolution being the target resolution and a frame rate being the target frame rate.

In some embodiments, the synthesis unit 55 is specifically configured to determine whether the second resolution is greater than the first resolution; if yes, determine the first resolution as the target resolution; if not, determine the second resolution as the target resolution.

In some embodiments, the synthesis unit 55 is specifically configured to determine whether the second frame rate is greater than the first frame rate; if yes, determine the first frame rate as the target frame rate; if not, determine the second frame rate as the target frame rate.

In some embodiments, the receiving unit 51 is further configured to receive a first instruction for instructing the synthesis of the at least two video clips according to a third resolution and a third frame rate;

the synthesis unit 55 is further configured to synthesize the at least two video clips according to the third resolution and the third frame rate in response to the first instruction.

The video synthesis apparatus provided in this embodiment can perform the video synthesis method provided by the above method embodiment, and its implementation principle and technical effect are similar and will not be repeated here.

Figure 6:
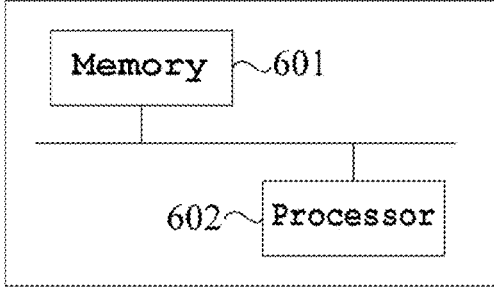
FIG. 6 is a schematic diagram of a hardware structure of an electronic device provided by an embodiment of the present disclosure.

Based on the same inventive concept, an embodiment of the present disclosure further provides an electronic device. FIG. 6 is a schematic structural diagram of an electronic device provided by the embodiment of the present disclosure. As shown in FIG. 6, the electronic device provided in this embodiment comprises: a memory 601 and a processor 602, wherein the memory 601 is configured to store a computer program; and the processor 602 is configured to, when executing the computer program, perform the video synthesis method provided in the above embodiment.

Based on the same inventive concept, an embodiment of the present disclosure further provides a computer readable storage medium on which a computer program is stored, wherein the computer program, when executed by a processor, causes the computing device to implement the video synthesis method provided in the above embodiment.

Based on the same inventive concept, an embodiment of the present disclosure further provides a computer program product, which, when running on a computer, causes the computing device to implement the video synthesis method provided in the above embodiment.

Based on the same inventive concept, an embodiment of the present disclosure further provides a computer program including instructions, which, when executed by a processor, causes the processor to implement the video synthesis method provided by the above embodiment.

Those skilled in the art should appreciate that the embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product that is carried out on one or more computer-usable storage media having computer-usable program code embodied therein.

The processor may be a central processing unit (CPU), or other general-purpose processor, a digital signal processor (DSP), an Application Specific Integrated Circuit (ASIC), a Field-Programmable Gate Array (FPGA) or other programmable logic device, discrete gate or transistor logic device, discrete hardware components, or the like. The general-purpose processor may be a microprocessor, or the processor may be any conventional processor or the like.

The memory may include forms of non-permanent memory, Random Access Memory (RAM) and/or non-volatile memory in computer readable media, such as Read Only Memory (ROM) or flash memory. The memory is an example of computer readable media.

Computer readable media include permanent and non-permanent, removable and non-removable storage media. The storage media may implement information storage by any method or technology, and the information may be computer readable instructions, data structures, program modules or other data. Examples of the computer storage media include, but are not limited to, phase change memory (PRAM), Static Random Access Memory (SRAM), Dynamic Random Access Memory (DRAM), other types of Random Access Memory (RAM), Read Only Memory (ROM), Electrically Erasable Programmable Read Only Memory (EEPROM), flash memory or other memory technology, compact disc read only memory (CD-ROM), Digital Versatile Disks (DVDs) or other optical storage, magnetic cassettes, magnetic disk storage or other magnetic storage devices, or any other non-transmission medium, which can be used to store information that can be accessed by a computing device. As defined herein, computer readable media do not include transitory computer readable media such as modulated data signals and carrier waves.

Finally, it should be noted that the above embodiments are only used to illustrate the technical solutions of the present disclosure, rather than to limit them. Although the present disclosure has been described in detail with reference to the aforementioned embodiments, those skilled in the art should understand that they can still modify the technical solutions described in the aforementioned embodiments, or replace some or all of the technical features therein by equivalents. However, these modifications or replacements do not cause the essence of the corresponding technical solutions to deviate from the scope of the technical solutions of the embodiments of the present disclosure.

What is claimed is:

1. A video synthesis method, which is applied to a video synthesis apparatus, the method comprising:

receiving a video synthesis instruction for instructing the synthesis of at least two video clips;

determining a hardware configuration parameter of the video synthesis apparatus;

determining performance information of the video synthesis apparatus according to the hardware configuration parameter;

determining a first resolution and a first frame rate according to the performance information and a preset correspondence, wherein the preset correspondence includes a correspondence between the performance information and the first resolution and the first frame rate; and synthesizing the at least two video clips based on the first resolution and the first frame rate.

2. The method according to claim 1, wherein the determining performance information of the video synthesis apparatus to the hardware configuration parameter comprises:

inputting the hardware configuration parameter into a preset model, and obtaining the performance information of the video synthesis apparatus output from the preset model.

3. The method according to claim 2, wherein the synthesizing the at least two video clips based on the first resolution and the first frame rate comprises:

determining a second resolution and a second frame rate, wherein the second resolution is a resolution of a video clip with a maximum resolution among the at least two video clips, and the second frame rate is a frame rate of a video clip with a maximum frame rate among the at least two video clips;

determining a target resolution according to the first resolution and the second resolution;

determining a target frame rate according to the first frame rate and the second frame rate; and synthesizing the at least two video clips into a video with a resolution being the target resolution and a frame rate being the target frame rate.

4. The method according to claim 1, wherein the synthesizing the at least two video clips based on the first resolution and the first frame rate comprises:

determining a second resolution and a second frame rate, wherein the second resolution is a resolution of a video clip with a maximum resolution among the at least two video clips, and the second frame rate is a frame rate of a video clip with a maximum frame rate among the at least two video clips;

determining a target resolution according to the first resolution and the second resolution;

determining a target frame rate according to the first frame rate and the second frame rate; and synthesizing the at least two video clips into a video with a resolution being the target resolution and a frame rate being the target frame rate.

5. The method according to claim 4, wherein the determining a target resolution according to the first resolution and the second resolution comprises:

determining whether the second resolution is greater than the first resolution;

if yes, determining the first resolution as the target resolution;

if not, determining the second resolution as the target resolution.

6. The method according to claim 4, wherein the determining a target frame rate according to the first frame rate and the second frame rate comprises:

determining whether the second frame rate is greater than the first frame rate;

if yes, determining the first frame rate as the target frame rate;

if not, determining the second frame rate as the target frame rate.

7. The method according to claim 5, wherein the determining a target frame rate according to the first frame rate and the second frame rate comprises:

determining whether the second frame rate is greater than the first frame rate;

if yes, determining the first frame rate as the target frame rate;

if not, determining the second frame rate as the target frame rate.

8. The method according to claim 1, wherein the method further comprises:

receiving a first instruction for instructing the synthesis of the at least two video clips according to a third resolution and a third frame rate;

in response to the first instruction, synthesizing the at least two video clips according to the third resolution and the third frame rate.

9. The method according to claim 8, wherein the synthesizing the at least two video clips according to the third resolution and the third frame rate comprises:

determining a second resolution and a second frame rate, wherein the second resolution is a resolution of a video clip with a maximum resolution among the at least two video clips, and the second frame rate is a frame rate of a video clip with a maximum frame rate among the at least two video clips;

determining a target resolution according to the third resolution and the second resolution;

determining a target frame rate according to the third frame rate and the second frame rate; and synthesizing the at least two video clips into a video with a resolution being the target resolution and a frame rate being the target frame rate.

10. The method according to claim 9, wherein the determining a target resolution according to the third resolution and the second resolution comprises:

determining whether the third resolution is greater than the second resolution;

if yes, determining the second resolution as the target resolution;

if not, determining the third resolution as the target resolution.

11. The method according to claim 10, wherein the determining a target frame rate according to the third frame rate and the second frame rate comprises:

determining whether the third frame rate is greater than the second frame rate;

if yes, determining the second frame rate as the target frame rate;

if not, determining the third frame rate as the target frame rate.

12. The method according to claim 9, wherein the determining a target frame rate according to the third frame rate and the second frame rate comprises:

determining whether the third frame rate is greater than the second frame rate;

if yes, determining the second frame rate as the target frame rate;

if not, determining the third frame rate as the target frame rate.

13. An electronic device, comprising: a memory and a processor, wherein the memory is configured to store a computer program; and the processor is configured to, when executing the computer program, cause the electronic device to implement a video synthesis method, comprising:

receiving a video synthesis instruction for instructing the synthesis of at least two video clips;

determining a hardware configuration parameter of a video synthesis apparatus;

determining performance information of the video synthesis apparatus according to the hardware configuration parameter;

determining a first resolution and a first frame rate according to the performance information and a preset correspondence, wherein the preset correspondence includes a correspondence between the performance information and the first resolution and the first frame rate; and synthesizing the at least two video clips based on the first resolution and the first frame rate.

14. The electronic device according to claim 13, wherein the determining performance information of the video synthesis apparatus according to the hardware configuration parameter comprises:

inputting the hardware configuration parameter into a preset model, and obtaining the performance information of the video synthesis apparatus output from the preset model.

15. The electronic device according to claim 13, wherein the synthesizing the at least two video clips based on the first resolution and the first frame rate comprises:

determining a second resolution and a second frame rate, wherein the second resolution is a resolution of a video clip with a maximum resolution among the at least two video clips, and the second frame rate is a frame rate of a video clip with a maximum frame rate among the at least two video clips;

determining a target resolution according to the first resolution and the second resolution;

determining a target frame rate according to the first frame rate and the second frame rate; and synthesizing the at least two video clips into a video with a resolution being the target resolution and a frame rate being the target frame rate.

16. The electronic device according to claim 15, wherein the determining a target resolution according to the first resolution and the second resolution comprises:

determining whether the second resolution is greater than the first resolution;

if yes, determining the first resolution as the target resolution;

if not, determining the second resolution as the target resolution.

17. A non-transitory computer readable storage medium storing a computer program thereon, wherein the computer program, when executed by a computing device, causes the computing device to implement a video synthesis method, comprising:

receiving a video synthesis instruction for instructing the synthesis of at least two video clips;

determining a hardware configuration parameter of a video synthesis apparatus;

determining performance information of the video synthesis apparatus according to the hardware configuration parameter;

determining a first resolution and a first frame rate according to the performance information and a preset correspondence, wherein the preset correspondence includes a correspondence between the performance information and the first resolution and the first frame rate; and synthesizing the at least two video clips based on the first resolution and the first frame rate.

18. The non-transitory computer readable storage medium according to claim 17, wherein the determining performance information of the video synthesis apparatus according to the hardware configuration parameter comprises:

inputting the hardware configuration parameter into a preset model, and obtaining the performance information of the video synthesis apparatus output from the preset model.

19. The non-transitory computer readable storage medium according to claim 17, wherein the synthesizing the at least two video clips based on the first resolution and the first frame rate comprises:

determining a second resolution and a second frame rate, wherein the second resolution is a resolution of a video clip with a maximum resolution among the at least two video clips, and the second frame rate is a frame rate of a video clip with a maximum frame rate among the at least two video clips;

determining a target resolution according to the first resolution and the second resolution;

determining a target frame rate according to the first frame rate and the second frame rate; and synthesizing the at least two video clips into a video with a resolution being the target resolution and a frame rate being the target frame rate.

20. The non-transitory computer readable storage medium according to claim 19, wherein the determining a target resolution according to the first resolution and the second resolution comprises:

determining whether the second resolution is greater than the first resolution;

if yes, determining the first resolution as the target resolution;

if not, determining the second resolution as the target resolution.

* * * * *